United States Patent
Nishida et al.

(10) Patent No.: US 10,129,849 B2
(45) Date of Patent: *Nov. 13, 2018

(54) MOBILE COMMUNICATION METHOD, MOBILE COMMUNICATION SYSTEM, AND MOBILE MANAGEMENT NODE

(71) Applicant: NEC Corporation, Tokyo (JP)

(72) Inventors: Katsutoshi Nishida, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,910

(22) Filed: Dec. 28, 2015

(65) Prior Publication Data

US 2016/0112989 A1    Apr. 21, 2016

Related U.S. Application Data

(63) Continuation of application No. 13/978,213, filed as application No. PCT/JP2011/077486 on Nov. 29, 2011, now abandoned.

(30) Foreign Application Priority Data

Jan. 7, 2011    (JP) ................................ 2011-002555

(51) Int. Cl.
*H04W 4/00*      (2018.01)
*H04W 68/02*     (2009.01)
(Continued)

(52) U.S. Cl.
CPC ......... *H04W 68/02* (2013.01); *H04W 68/005* (2013.01); *H04W 76/34* (2018.02); *H04W 76/27* (2018.02)

(58) Field of Classification Search
CPC combination set(s) only.
See application file for complete search history.

(56) References Cited

U.S. PATENT DOCUMENTS 8,515,465 B2 * 8/2013 Olsson .................. H04W 68/00
                                                                370/312
8,848,648 B2 * 9/2014 Wang .................. H04W 76/048
                                                                370/328

(Continued)

FOREIGN PATENT DOCUMENTS

CN    101483889 A    7/2009
CN    101541081 A    9/2009

(Continued)

OTHER PUBLICATIONS

3GPP TR 23.857, Technical Report, Technical Specification Group Core Network and Terminals, Study of EPC Nodes Restoration, Release 10, V1.0.1, Dec. 2010, 24 pages.

(Continued)

*Primary Examiner* — Frank Duong
(74) *Attorney, Agent, or Firm* — Foley & Lardner LLP (57) ABSTRACT

A mobile communication method in a mobile communication system according to the present invention in which when MME#1 is restarted in a first state in which a PDN connection #1 including one or more EPS bearers #1 is set among a UE, an S-GW#1, and a P-GW#1, the first state transitions to a second state in which the PDN connection #1 is released between the UE and the S-GW#1 and the connection is maintained only between the S-GW#1 and the P-GW#1, the mobile communication method including the step of not transmitting, by the MME#1, "Paging" whose destination is the UE upon receiving "DDN" including IMSI of the UE after detecting that re-attach processing for the mobile station has been executed in the second state.

11 Claims, 4 Drawing Sheets

(51) Int. Cl.
*H04W 68/00* (2009.01)
*H04W 76/34* (2018.01)
*H04W 76/27* (2018.01)

(56) References Cited

U.S. PATENT DOCUMENTS

| | | | | |
|---|---|---|---|---|
| 8,995,250 | B2* | 3/2015 | Chen | H04W 24/04 |
| | | | | 370/216 |
| 9,282,578 | B2* | 3/2016 | Nishida | H04W 8/30 |
| 2010/0056147 | A1 | 3/2010 | Sun et al. | |
| 2011/0310868 | A1* | 12/2011 | Yang | H04W 68/00 |
| | | | | 370/338 |
| 2012/0113894 | A1* | 5/2012 | Yang | H04W 60/04 |
| | | | | 370/328 |
| 2012/0202496 | A1 | 8/2012 | Okabe et al. | |
| 2012/0202532 | A1 | 8/2012 | Okabe et al. | |
| 2012/0214519 | A1 | 8/2012 | Okabe et al. | |
| 2012/0300640 | A1 | 11/2012 | Okabe et al. | |
| 2013/0142120 | A1 | 6/2013 | Nishida et al. | |
| 2013/0148594 | A1 | 6/2013 | Nishida et al. | |

FOREIGN PATENT DOCUMENTS

| | | |
|---|---|---|
| CN | 103083547 A | 5/2013 |
| EP | 2 600 668 A1 | 6/2013 |
| RU | 2407164 C2 | 9/2009 |
| RU | 2009111601 A | 10/2010 |
| WO | WO 2011/136248 A1 | 11/2011 |

OTHER PUBLICATIONS

3GPP TS 23.007 Technical Specification Group Core Network and Terminals; Restoration procedures (Release 10), V. 10.2.0, Dec. 2010, 43 pgs.

"Pseudo-CR on Avoid IMSI page after successful reattach". 3GPP TSG CT4 Meeting #51bis, Jan. 24-28, 2011 (5 pgs.).

Extended European Search Report dated Jul. 4, 2014 in related European application No. 14154204.3 (8 pgs.).

Extended European Search Report dated Jul. 4, 2014 in related European application No. 11855189.4 (9 pgs.).

Decision on Grant dated Sep. 25, 2015 in related Russian Application No. 2013136909/08(055553) with English-language translation (10 pgs.).

NEC, "EPC node failure", 3GPP TSG CT4 Meeting #49, C4-101116, May 10-14, 2010 (8 pgs.).

Office Action dated Sep. 1, 2016 in related Chinese Appl. 201180064338.8 with English-language translation (16 pgs.).

Third Office Action dated Dec. 1, 2016 in related Chinese Appl. 201180064338.8 with English-language translation (14 pgs.).

Office Action dated Dec. 23, 2015 in related Chinese Appl. No. 201180064338.8 with English-language translation (15 pgs.).

* cited by examiner

MOBILE COMMUNICATION METHOD, MOBILE COMMUNICATION SYSTEM, AND MOBILE MANAGEMENT NODE

CROSS REFERENCE TO RELATED APPLICATIONS

This application is a continuation of U.S. application Ser. No. 13/978,213, filed Sep. 19, 2013; which is a national stage entry of PCT/JP2011/077486, filed Nov. 29, 2011; which claims priority to Japanese Application No. 2011-002555, filed Jan. 7, 2011. The contents of all prior applications are hereby incorporated by reference in their entirety.

TECHNICAL FIELD

The present invention relates to a mobile communication method, a mobile management node, and a serving gateway apparatus.

BACKGROUND ART

In a mobile communication system of an EPS (Evolved Packet System) type specified in 3GPP, there is proposed an operation to be carried out when a P-GW (Packet Data Network-Gateway, packet data network gateway apparatus) #1 receives user data whose destination is a UE (User Equipment) in an idle state under control of an MME (Mobility Management Entity, mobile management node) #1, after the MME#1 which has been suspended due to a failure or the like is restarted.

The operation will be described below with reference to FIG. 4.

Figure 4:
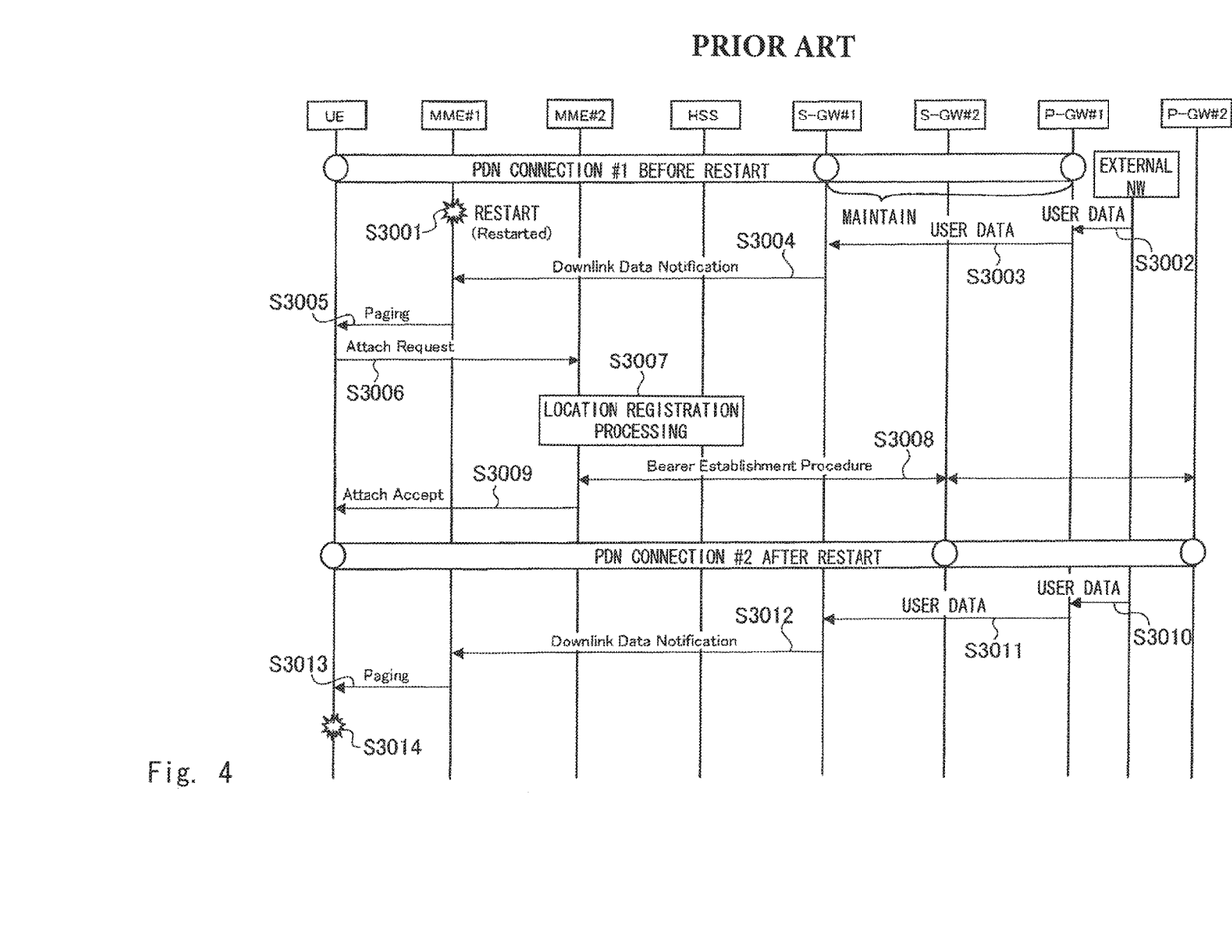
FIG. 4 is a sequence diagram illustrating operation of a mobile communication system of a related art.

As shown in FIG. 4, when the MME#1 is restarted in step S3001 in a state (first state) in which a PDN connection #1 including one or more EPS bearers #1 is set among the UE, an S-GW (Serving Gateway, serving gateway apparatus) #1, and the P-GW#1, the state transitions to a state (second state) in which the PDN connection #1 is released between the UE and the S-GW#1 and the PDN connection #1 is maintained only between the S-GW#1 and the P-GW#1.

In step S3002, upon receiving user data whose destination is the UE on the EPS bearer #1 from an external network, the P-GW#1 transmits the user data whose destination is the UE to the S-GW#1 through the EPS bearer #1 in step S3003.

In step S3004, the S-GW#1 transmits "DDN (Downlink Data Notification, downlink notification signal)" to the MME#1, because the PDN connection #1 is released between the UE and the S-GW#1.

In step S3005, upon receiving the "DDN", the MME#1 transmits "Paging" whose destination is the UE specified by "IMSI (International Mobile Subscriber Identity)" included in the "DDN".

In step S3006, upon receiving the "Paging" whose destination is the UE, the UE transmits "Attach Request (attach request signal)" to a core network so as to start re-attach processing. The "Attach Request" is transferred to an MME#2 via a radio access network.

In step S3007, the MME#2 performs location registration processing for the UE with an HSS (Home Subscriber Server, subscriber information server apparatus).

In step S3008, a PDN connection #2 including one or more EPS bearers #2 is set among the UE, an S-GW#2, and a P-GW#2.

In step S3009, the MME#2 transmits "Attach Accept" to the UE.

CITATION LIST

Non Patent Literature

[Non Patent Literature 1] 3GPP TR23.857

SUMMARY OF INVENTION

Technical Problem

However, in the example of FIG. 4, when the P-GW#1 receives the user data whose destination is the UE on the EPS bearer #1 from the external network in step S3010, the following problem occurs.

That is, in step S3011, the P-GW#1 transmits the user data whose destination is the UE to the S-GW#1 through the EPS bearer #1, and in step S3012, the S-GW#1 transmits, in a similar manner as step S3004, the "DDN" in which the IMSI is set to the MME #1 because the PDN connection #1 is released between the UE and the S-GW#1.

As a result, in step S3013, upon receiving the "DDN", the MME#1 transmits the "Paging" whose destination is the UE specified by the "IMSI" included in the "DDN", thereby consuming unnecessary radio resources while causing a communication disconnect in step S3014.

Alternatively, when the MME#1 holds S-TMSI or the like in a memory, the "Paging" whose destination is to the UE specified by the S-TMSI in place of the IMSI may be transmitted. In this case, transmission of the "Paging" in step S3013 consumes unnecessary radio resources.

Accordingly, the present invention has been made in view of the above-mentioned problem, and an object of the present invention is to provide a mobile communication method, a mobile management node, and a serving gateway apparatus which are capable of avoiding transmission of the unnecessary paging signal after the MME#1 which has been suspended due to a failure or the like is restarted.

Solution to Problem

A first exemplary aspect of the present invention is a mobile communication method in a mobile communication system in which when a first mobile management node is restarted in a first state in which a connection including one or more bearers is set among a mobile station, a first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the mobile communication method including the step of not transmitting, by the first mobile management node, a paging signal whose destination is the mobile station upon receiving a downlink data notification signal including identification information of the mobile station after detecting that re-attach processing for the mobile station is completed in the second state.

A second exemplary aspect of the present invention is a mobile management node that operates as a first mobile management node for use in a mobile communication system in which when the first mobile management node is restarted in a first state in which a connection including one or more bearers is set among a mobile station, a first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the mobile management node being configured not to transmit a paging signal whose destination is the mobile station upon receiving a downlink data notification signal including identification information of the mobile station after detecting that re-attach processing for the mobile station is completed in the second state.

A third exemplary aspect of the present invention is a serving gateway apparatus that operates as a first serving gateway apparatus in a mobile communication system in which when a first mobile management node is restarted in a first state in which a connection including one or more bearers is set among a mobile station, a first serving gateway apparatus, and a first packet data network gateway apparatus, the first state transitions to a second state in which the connection is released between the mobile station and the first serving gateway apparatus and the connection is maintained only between the first serving gateway apparatus and the first packet data network gateway apparatus, the serving gateway apparatus being configured to release the connection upon, in the second state, transmitting to the first mobile management node a downlink data notification signal including identification information of the mobile station in response to user data whose destination is the mobile station received through the bearer and also receiving a response signal for the downlink data notification signal including notification information for requesting release of the connection.

Advantageous Effects of Invention

As described above, according to the present invention, it is possible to provide a mobile communication method, a mobile management node, and a serving gateway apparatus which are capable of avoiding transmission of an unnecessary paging signal after the MME#1 which has been suspended due to a failure or the like is restarted.

DESCRIPTION OF EMBODIMENTS (Mobile Communication System According to a First Exemplary Embodiment of the Present Invention)

Figure 1:
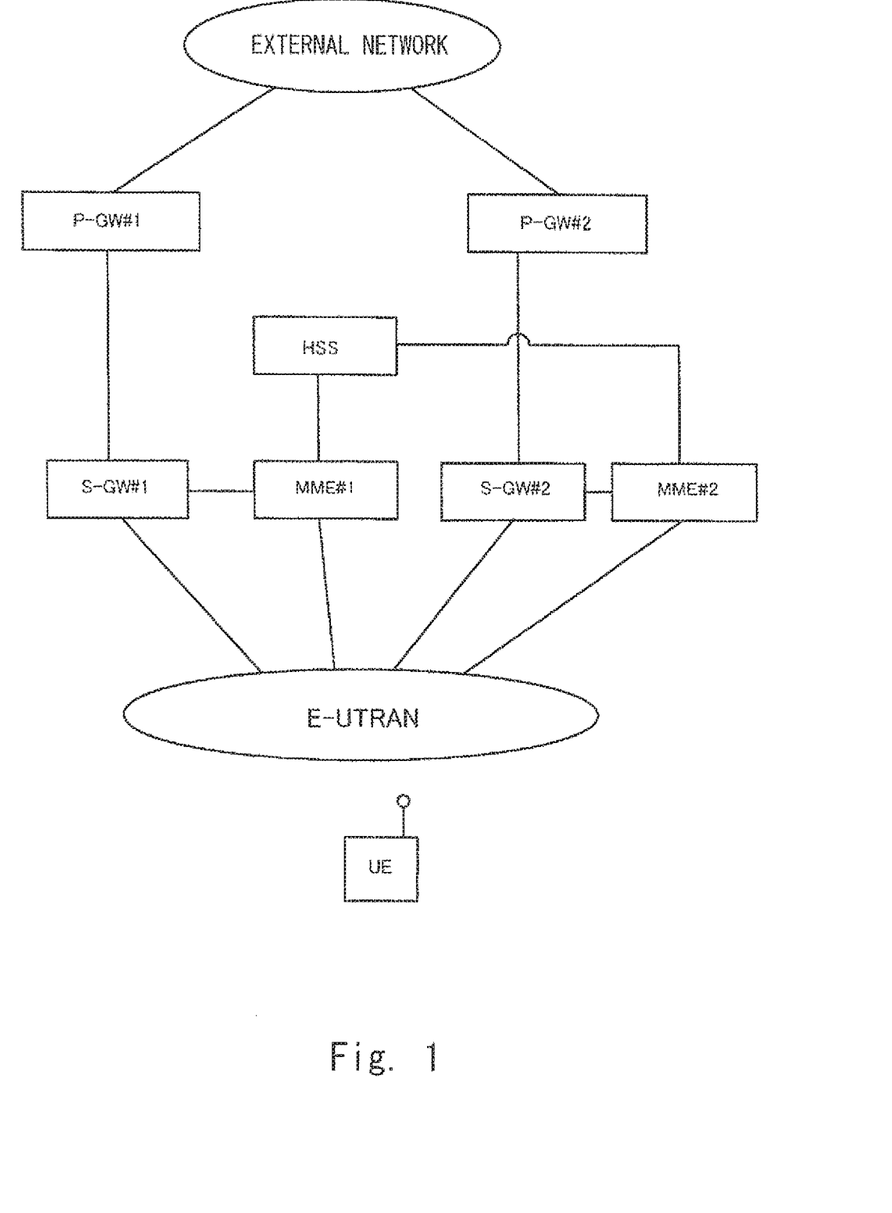
FIG. 1 is an overall configuration diagram of a mobile communication system according to a first exemplary embodiment of the present invention.
Figure 2:
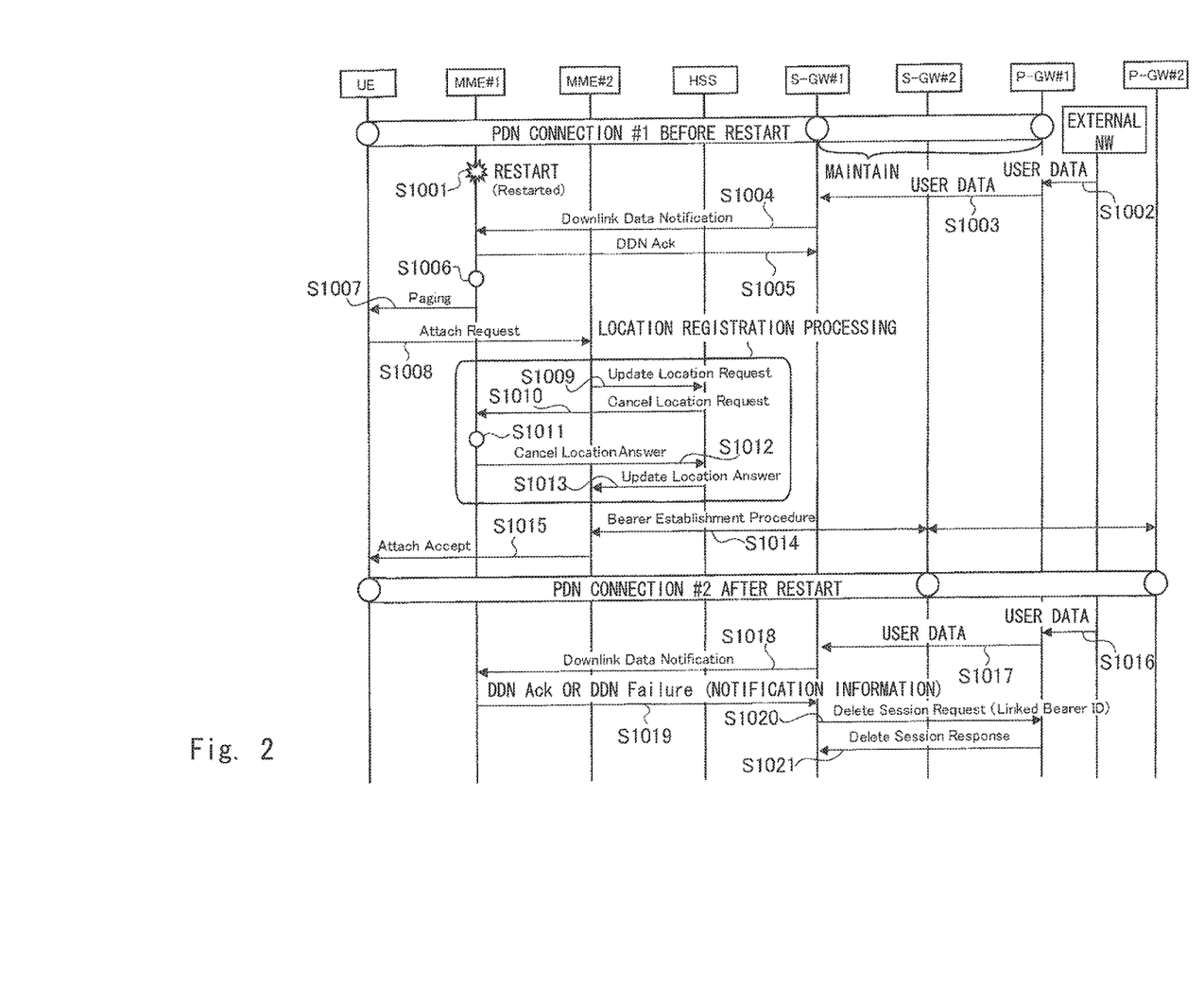
FIG. 2 is a sequence diagram illustrating operation of the mobile communication system according to the first exemplary embodiment of the present invention.

Referring to FIGS. 1 and 2, a mobile communication system according to the first exemplary embodiment of the present invention will be described.

As shown in FIG. 1, the mobile communication system according to this exemplary embodiment includes a P-GW#1, a P-GW#2, an S-GW#1, an S-GW#2, an MME#1, an MME#2, an E-UTRAN (Evolved Universal Terrestrial Radio Access Network), and an HSS.

Hereinafter, referring to FIG. 2, description will be made of operation to be carried out when the P-GW#1 receives user data whose destination is a UE in an idle state under control of the MME#1, after the MME#1 which has been suspended due to a failure or the like is restarted in the mobile communication system according to this exemplary embodiment.

As shown in FIG. 2, when the MME#1 is restarted in step S1001 in a state (first state) in which a PDN connection #1 including one or more EPS bearers #1 is set among the UE, the S-GW#1, and the P-GW#1, the state transitions to a state (second state) in which the PDN connection #1 is released between the UE and the S-GW#1 and the PDN connection #1 is maintained only between the S-GW#1 and the P-GW#1.

Note that in this case, the S-GW#1 may be set such that only a specific EPS bearer in the PDN connection #1 is not released between the S-GW#1 and the P-GW#1.

The EPC bearer may be set the necessity of releasing the EPS bearer in the S-GW#1 by use of QCI (QoS Class Identifier), a priority type "ARP (Allocation Retention Priority)", or the like.

Upon receiving user data whose destination is the UE on an EPS bearer #1 from an external network in step S1002, the P-GW#1 transmits the user data whose destination is the UE to the S-GW#1 through the EPS bearer #1 in step S1003.

In step S1004, the S-GW#1 transmits the "DDN" including an IMSI of the UE and "EPS Bearer ID#1" which is identification information of the EPS bearer #1 to the MME#1, because the PDN connection #1 is released between the UE and the S-GW#1 (that is, because restart of the MME#1 is detected by a GTP echo signal or the like). Note that the "EPS Bearer ID#1" shall not necessarily be set.

In step S1005, the MME#1 transmits "DDN Ack", which is a response signal for "DDN", to the S-GW#1. Note that the "DDK Ack" shall not necessarily be transmitted.

In step S1006/S1007, upon receiving the "DDN" in which the IMSI is set, the MME#1 transmits "Paging" whose destination is the UE specified by the "IMSI" included in the "DDN" while storing information indicating the transmission of the "Paging".

When the MME#1 holds S-TMSI or the like in a memory, the "Paging" whose destination is the UE specified by the S-TMSI in place of the IMSI may be transmitted.

In this case, prior to execution of step S1008, the UE transmits "Service Request" to the MME#1, and the MME#1 notifies the UE of a reject signal, thereby activating step S1008 which is described later.

In step S1008, upon receiving the "Paging" whose destination is the UE, the UE transmits the "Attach Request" including the IMSI of the UE to a core network so as to start re-attach processing. The "Attach Request" is transferred to the MME#2 via a radio access network.

In step S1009, the MME#2 transmits "Update Location Request" to the HSS so as to start location registration processing for the UE.

In step S1010, the HSS transmits "Cancel Location Request (positional information deletion request signal)" to the MME#1.

In step S1011, the MME#1 detects that the UE re-attached by having received the "Cancel Location Request".

In step S1012, the MME#1 transmits "Cancel Location Answer" to the HSS.

In step S1013, the HSS transmits "Update Location Request" to the MME#2.

In step S1014, a PDN connection #2 including one or more EPS bearers #2 is set among the UE, the S-GW#2, and the P-GW#2.

In step S1015, the MME#2 transmits "Attach Accept" to the UE.

After that, upon receiving the user data whose destination is the UE on the EPS bearer #1 from the external network in step S1016, the P-GW#1 transmits the user data whose destination is the UE to the S-GW#1 through the EPS bearer #1 in step S1017.

In step S1018, the S-GW#1 transmits the "DDN" including the IMSI of the UE to the MME#1, in a similar manner as step S1003, because the PDN connection #1 is released between the UE and the S-GW#1.

Here, since the MME#1 has detected that the UE specified by the "IMSI" included in the "DDN" is already attached, the MME#1 will not transmit the "Paging" whose destination is the UE.

After that, in step S1019, the MME#1 transmits to the S-GW#1 the "DDN Ack" or "DDN Failure" including notification information for requesting release of the PDN connection #1 of the UE held between the S-GW#1 and the P-GW#1.

Here, the MME#1 may include the "EPS Bearer ID#1" in the "DDN Ack" or the "DDN Failure". Further, when the MME#1 holds context information (information on the UE), such as the S-TMSI allocated to the UE before restart, in the memory, the context information may be deleted.

In step S1020, upon receiving the above-mentioned "notification information", the S-GW#1 transmits "Delete Session Request" including "Linked Bearer ID#1" corresponding to the "IMSI" of the UE to the P-GW#1 so as to release the PDN connection #1 which is set between the S-GW#1 and the P-GW#1 and which corresponds to the "EPS Bearer ID#1".

The term "Linked Bearer ID#1" herein described refers to identification information for identifying the PDN connection #1.

In step S1021, after the PDN connection #1 is released, the P-GW#1 transmits "Delete Session Response" to the S-GW#1.

The mobile communication system according to this exemplary embodiment is configured such that, upon receiving the "Cancel Location Request" for the UE, the MME#1 detects that the UE has re-attached, and after that, even upon receiving the "DDN" in which the IMSI is set for instructing transmission of the "Paging" whose destination is the UE, the MME#1 will not transmit the "Paging" whose destination is the UE. Avoiding transmission of the unnecessary "Paging" in this way enables avoiding consumption of unnecessary radio resources and generation of communication disconnect.

(Modified Example 1)

Figure 3:
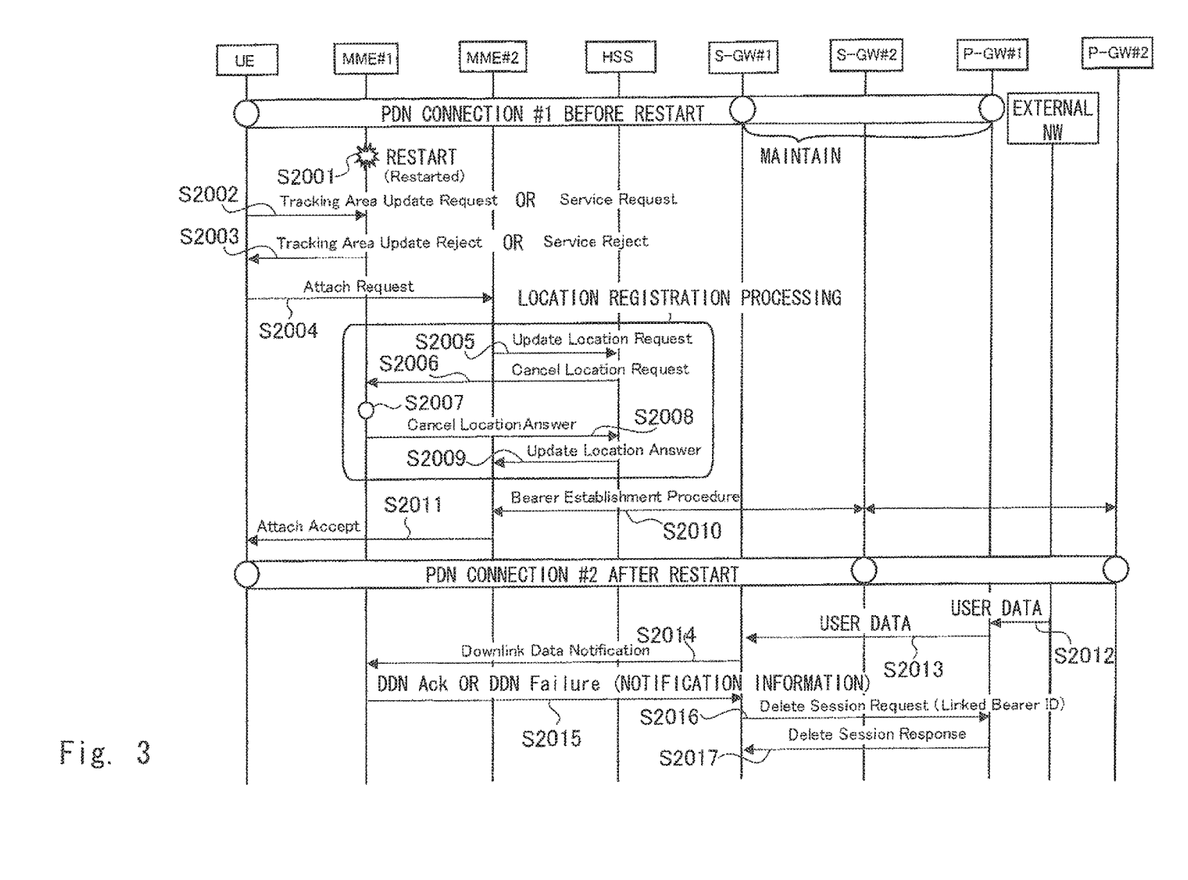
FIG. 3 is a sequence diagram illustrating operation of a mobile communication system according to Modified Example 1 of the present invention.

Referring to FIG. 3, a mobile communication system according to Modified Example 1 of the present invention will be described below while focusing on the differences from the mobile communication system according to the first exemplary embodiment described above.

Hereinafter, referring to FIG. 3, description will be made of operation to be carried out when the P-GW#1 receives user data whose destination is the UE in the idle state under control of the MME#1, after the MME#1 which has been suspended due to a failure or the like is restarted in the mobile communication system according to Modified Example 1 of the present invention.

As shown in FIG. 3, when the MME#1 is restarted in step S2001 in a state (first state) in which the PDN connection #1 including one or more EPS bearers #1 is set among the UE, the S-GW#1, and the P-GW#1, the state transitions to a state (second state) in which the PDN connection #1 is released between the UE and the S-GW#1 and the PDN connection #1 is maintained only between the S-GW#1 and the P-GW#1.

In step S2002, the UE transmits "Tracking Area Update Request (location registration area update request signal)" or "Service Request (service request signal)" to the MME#1.

Upon receiving the "Tracking Area Update Request" or the "Service Request", the MME#1 transmits "Tracking Area Update Reject (location registration area reject signal" or "Service Reject (service reject signal)" to the UE because the MME#1 does not hold the context information of the UE in step S2003.

In step S2004, upon receiving the "Tracking Area Update Request" or the "Service Request", the UE transmits the "Attach Request" to the MME#2.

The operations in steps S2005 to S2017 are the same as the operations in steps S1009 to S1021 shown in FIG. 2.

Note that the present invention is not limited to the above-described cases, but can also be applied to the case where the UE transmits the "Attach Request" to the restarted MME#1, upon executing the re-attach processing.

That is, in this case, as the MME#1 is aware that the UE is re-connected, upon receiving the "DDN" in which the IMSI of the UE is set, the MME#1 transmits to the S-GW#1 the "DDN Ack" or the "DDN Failure" including the notification information for requesting release of the PDN connection #1 held between the S-GW#1 and the P-GW#1.

The aspects of the above-described exemplary embodiments may be also expressed as follows.

A first exemplary aspect of this exemplary embodiment is a mobile communication method in a mobile communication system in which when the MME#1 (first mobile management node) is restarted in the first state in which the PDN connection #1 (connection) including one or more EPS bearers #1 (bearer) is set among the UE (mobile station), the S-GW#1 (first serving gateway apparatus), and the P-GW#1 (first packet data network gateway apparatus), the first state transitions to the second state in which the PDN connection #1 is released between the UE and the S-GW#1 and the PDN connection #1 is maintained only between the S-GW#1 and the P-GW#1, the mobile communication method including the step of not transmitting, by the MME#1, the "Paging (paging signal)" whose destination is the UE upon receiving the "DDN (downlink data notification signal)" including the IMSI of the UE (identification information of the mobile station) after detecting that the re-attach processing for the UE has been executed in the second state.

The first exemplary aspect of this exemplary embodiment may further include the steps of: notifying, by the MME#1, the S-GW#1 of not transmitting the "Paging" when not transmitting the "Paging" whose destination is the UE; and releasing, by the S-GW#1, the PDN connection #1 (connection) between the S-GW#1 and the P-GW#1 in response to the notification.

A second exemplary aspect of this exemplary embodiment is an MME that operates as the MME#1 in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the MME being configured not to transmit the "Paging" whose destination is the UE upon receiving the "DDN" including the IMSI of the UE after detecting that the re-attach processing for the UE has been executed in the second state.

In the second exemplary aspect of this exemplary embodiment, when the MME does not transmit the "Paging" whose destination is the UE, the MME may be configured to notify the S-GW#1 of not transmitting the "Paging".

A third exemplary aspect of this exemplary embodiment is an S-GW that operates as the S-GW#1 in a mobile communication system in which when the MME#1 is restarted in the first state in which the PDN connection #1 including one or more EPS bearers #1 is set among the UE, the S-GW#1, and the P-GW#1, the first state transitions to the second state in which the PDN connection #1 is released between the UE and the S-GW#1 and the PDN connection #1 is maintained only between the S-GW#1 and the P-GW#1, the S-GW being configured to release the PDN connection #1 upon, in the second state, transmitting to the MME#1 the "DDN" including the IMSI of the UE in response to the user data whose destination is the UE received through the EPS bearer #1 and also receiving the "DDN Ack" or the "DDN Failure" including the notification information for requesting release of the PDN connection #1.

Note that the above-described operations of the MME#1, MME#2, S-GW#1, S-GW#2, P-GW#1, P-GW#2, eNB#1, eNB#2, and UE may be implemented by hardware, a software module executed by a processor, or a combination thereof.

The software module may be provided in storage media of any form such as RAM (Random Access Memory), flash memory, ROM (Read Only Memory), EPROM (Erasable Programmable ROM), EEPROM (Electronically Erasable and Programmable ROM), register, hard disk, removable disk, or CD-ROM.

The storage media are connected to the processor so that the processor can read and write information from and to the storage media. The storage media may be integrated in the processor. The storage media and the processor may be provided in an ASIC. The ASIC may be provided in the MME#1, MME#2, S-GW#1, S-GW#2, P-GW#1, P-GW#2, eNB#1, eNB#2, and UE. The storage media and the processor may be provided, as discrete components, in the MME#1, MME#2, S-GW#1, S-GW#2, P-GW#1, P-GW#2, eNB#1, eNB#2, and UE.

Though the present invention has been described above in detail with reference to the above-described exemplary embodiments, it is apparent to those skilled in the art that the present invention is not limited to the exemplary embodiments herein described. The present invention can be implemented as modified and changed modes without departing from the gist and scope of the present invention as defined by the claims. Therefore, the description of the specification is intended for explaining the example only and does not impose any limited meaning to the present invention.

REFERENCE SIGNS LIST

UE MOBILE STATION
eNB RADIO BASE STATION
MME#1, MME#2 MOBILE MANAGEMENT NODE
S-GW#1, S-GW#2 SERVING GATEWAY APPARATUS
P-GW#1, P-GW PDN GATEWAY APPARATUS
HSS SUBSCRIBER INFORMATION MANAGEMENT SERVER

The invention claimed is:

1. A system comprising:
a terminal;
a first core network node;
a second core network node;
a device for managing subscriber information; and
a gateway; wherein
    a connection between the terminal and the first core network node has been established,
    the terminal is configured to:
        send an Attach Request to the second core network node after the first core network node restarts,
    the second core network node is configured to:
        receive the Attach Request from the terminal, then send an Update Location Request to the device,
    the device is configured to:
        receive the Update Location Request from the second core network node, then
        send a Cancel Location Request to the first core network node, and the first core network node is configured to:
            send a Downlink Data Notification Acknowledge or a Downlink Data Notification Failure to the gateway based on having received the Cancel Location Request from the device.

2. A terminal, wherein a connection between the terminal and a first core network node has been established, configured to:
    send an Attach Request to a second core network node after the first core network node restarts, so that
        the second core network node sends an Update Location Request to a device for managing subscriber information, and then
        the device sends a Cancel Location Request to the first core network node, and
        the first core network node sends a Downlink Data Notification Acknowledge or a Downlink Data Notification Failure to a gateway based on having received the Cancel Location Request from the device.

3. A first core network node, wherein a connection between a terminal and the first core network node has been established, configured to:
    send a Downlink Data Notification Acknowledge or a Downlink Data Notification Failure to a gateway based on having received a Cancel Location Request from a device for managing subscriber information, wherein
        the terminal is configured to:
            send an Attach Request to a second core network node after the first core network node restarts,
        the second core network node is configured to:
            receive the Attach Request from the terminal, then send an Update Location Request to the device, and
        the device is configured to:
            receive the Update Location Request from the second core network node, then
            send the Cancel Location Request to the first core network node.

4. A second core network node, wherein a connection between a terminal and a first core network node has been established, configured to:
    receive an Attach Request from the terminal, then send an Update Location Request to a device for managing subscriber information, so that
        the device sends a Cancel Location Request to the first core network node, and the first core network node sends a Downlink Data Notification Acknowledge or a Downlink Data Notification Failure to a gateway based on having received the Cancel Location Request from the device, wherein the terminal is configured to:
send the Attach Request to the second core network node after the first core network node restarts.

5. A device for managing subscriber information, wherein a connection between a terminal and a first core network node has been established, configured to:

receive an Update Location Request from a second core network node, then send a Cancel Location Request to the first core network node, so that
the first core network node sends a Downlink Data Notification Acknowledge or a Downlink Data Notification Failure to a gateway based on having received the Cancel Location Request from the device, wherein
the terminal is configured to:
send an Attach Request to the second core network node after the first core network node restarts,
the second core network node is configured to:
receive the Attach Request from the terminal, then send the Update Location Request to the device.

6. A gateway, wherein a connection between a terminal and a first core network node has been established, configured to:

receive a Downlink Data Notification Acknowledge or a Downlink Data Notification Failure from the first core network node, wherein
the terminal is configured to:
send an Attach Request to a second core network node after the first core network node restarts,
the second core network node is configured to:
receive the Attach Request from the terminal, then send an Update Location Request to a device for managing subscriber information,
the device is configured to:
receive the Update Location Request from the second core network node, then
send a Cancel Location Request to the first core network node, and
the first core network node is configured to:
send the Downlink Data Notification Acknowledge or the Downlink Data Notification Failure to the gateway based on having received the Cancel Location Request from the device.

7. A method, wherein a connection between a terminal and a first core network node has been established, comprising:

sending an Attach Request to a second core network node after the first core network node restarts, so that
the second core network node sends an Update Location Request to a device for managing subscriber information, and then
the device sends a Cancel Location Request to the first core network node, and
the first core network node sends a Downlink Data Notification Acknowledge or a Downlink Data Notification Failure to a gateway based on having received the Cancel Location Request from the device.

8. A method, wherein a connection between a terminal and a first core network node has been established, comprising:

sending a Downlink Data Notification Acknowledge or a Downlink Data Notification Failure to a gateway based on having received a Cancel Location Request from a device for managing subscriber information, wherein
the terminal is configured to:
send an Attach Request to a second core network node after the first core network node restarts,
the second core network node is configured to:
receive the Attach Request from the terminal, then send an Update Location Request to the device, and
the device is configured to:
receive the Update Location Request from the second core network node, then
send the Cancel Location Request to the first core network node.

9. A method, wherein a connection between a terminal and a first core network node has been established, comprising:

receiving an Attach Request from the terminal; then
sending an Update Location Request to a device for managing subscriber information, so that
the device sends a Cancel Location Request to the first core network node, and
the first core network node sends a Downlink Data Notification Acknowledge or a Downlink Data Notification Failure to a gateway based on having received the Cancel Location Request from the device, wherein
the terminal is configured to:
send the Attach Request to a second core network node after the first core network node restarts.

10. A method, wherein a connection between a terminal and a first core network node has been established, comprising:

receiving an Update Location Request from a second core network node; then
sending a Cancel Location Request to the first core network node, so that
the first core network node sends a Downlink Data Notification Acknowledge or a Downlink Data Notification Failure to a gateway based on having received the Cancel Location Request from a device for managing subscriber information, wherein
the terminal is configured to:
send an Attach Request to the second core network node after the first core network node restarts,
the second core network node is configured to:
receive the Attach Request from the terminal, then send the Update Location Request to the device.

11. A method, wherein a connection between a terminal and a first core network node has been established, comprising:

receiving a Downlink Data Notification Acknowledge or a Downlink Data Notification Failure from the first core network node, wherein
the terminal is configured to:
send an Attach Request to a second core network node after the first core network node restarts,
the second core network node is configured to:
receive the Attach Request from the terminal, then send an Update Location Request to a device for managing subscriber information,
the device is configured to:
receive the Update Location Request from the second core network node, then
send a Cancel Location Request to the first core network node, and the first core network node is configured to:
    send the Downlink Data Notification Acknowledge or the Downlink Data Notification Failure to a gateway based on having received the Cancel Location Request from the device.

* * * * *